US 8,075,211 B2

(12) United States Patent
Yamamoto (10) Patent No.: US 8,075,211 B2
(45) Date of Patent: Dec. 13, 2011

(54) PRINTING SYSTEM, POST-PROCESSING DEVICE AND COMPUTER READABLE MEDIUM STORING PROGRAM THEREFOR

(75) Inventor: Yoshikazu Yamamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1103 days.

(21) Appl. No.: 11/905,962

(22) Filed: Oct. 5, 2007

(65) Prior Publication Data

US 2008/0187384 A1 Aug. 7, 2008

(30) Foreign Application Priority Data

Feb. 1, 2007 (JP) ................................ 2007-022778

(51) Int. Cl.
*B41J 11/66* (2006.01)
*B65H 39/10* (2006.01)
(52) U.S. Cl. ...... 400/621; 399/407; 270/5.02; 270/21.1; 270/52.09
(58) Field of Classification Search .............. 400/621; 399/407; 270/18, 5.02, 21.1, 52.09
See application file for complete search history.

(56) References Cited

U.S. PATENT DOCUMENTS

| | | | |
|---|---|---|---|
| 2005/0061172 A1* | 3/2005 | Palmatier | 101/227 |
| 2005/0225804 A1* | 10/2005 | Arquilevich et al. | 358/1.18 |
| 2006/0133845 A1* | 6/2006 | Savitzky et al. | 399/84 |
| 2007/0022892 A1* | 2/2007 | Currans et al. | 101/483 |
| 2009/0251721 A1* | 10/2009 | Knodt et al. | 358/1.15 |

FOREIGN PATENT DOCUMENTS

| | | |
|---|---|---|
| JP | A-11-249346 | 9/1999 |
| JP | A 2004-053857 | 2/2004 |

OTHER PUBLICATIONS

Office Action issued on Jul. 21, 2011 in Japanese Application No. 2007-022778. (with English language translation).

* cited by examiner

*Primary Examiner* — Leslie J Evanisko
(74) *Attorney, Agent, or Firm* — Oliff & Berridge, PLC (57) ABSTRACT

A printing system includes a printing unit that, after printing information across plural pages, prints print result relevant information about printing of the plural pages on continuous forms paper following the plural pages; a holder unit that receives and holds the continuous forms paper printed by the printing unit in the same order in which the paper has been printed by the printing unit; a paper feeding unit that feeds the printed continuous forms paper which has been held in the holder unit in reverse order to the order in which the paper has been printed by the printing unit; a reading unit that reads the print result relevant information printed on the continuous forms paper fed by the paper feeding unit; and a post-processing unit that post-processes the continuous forms paper fed by the paper feeding unit, based on the print result relevant information read by the reading unit.

3 Claims, 13 Drawing Sheets

REUSABLE/NOT REUSABLE
INFORMATION

| 1st PAGE | NOT REUSABLE |
|---|---|
| 2nd PAGE | NOT REUSABLE |
| 3rd PAGE | NOT REUSABLE |
| 4th PAGE | NOT REUSABLE |
| 5th PAGE | REUSABLE |
| ⋮ | ⋮ |
| 39th PAGE | REUSABLE |
| 40th PAGE | NOT REUSABLE |

PRINTING SYSTEM, POST-PROCESSING DEVICE AND COMPUTER READABLE MEDIUM STORING PROGRAM THEREFOR

CROSS-REFERENCE TO RELATED APPLICATIONS

This application is based on and claims priority under 35 USC 119 from Japanese Patent Application No. 2007-022778 filed Feb. 1, 2007.

BACKGROUND

Technical Field

The present invention relates to a printing system, an image forming apparatus, a post-processing device, and a computer readable medium storing a program therefor.

SUMMARY

According to an aspect of the invention, there is provided a printing system including a printing unit that, after printing information across plural pages, prints print result relevant information about printing of the plural pages on continuous forms paper following the plural pages; a holder unit that receives and holds the continuous forms paper printed by the printing unit in the same order in which the paper has been printed by the printing unit; a paper feeding unit that feeds the printed continuous forms paper which has been held in the holder unit in reverse order to the order in which the paper has been printed by the printing unit; a reading unit that reads the print result relevant information printed on the continuous forms paper fed by the paper feeding unit; and a post-processing unit that post-processes the continuous forms paper fed by the paper feeding unit, based on the print result relevant information read by the reading unit.

BRIEF DESCRIPTION OF THE DRAWINGS

Exemplary embodiments of the present invention will be described in detail based on the following figures, wherein.

DETAILED DESCRIPTION

In the following, exemplary embodiments of the present invention will be described in detail with reference to the drawings.

A printing system according to an exemplary embodiment is composed of an image forming apparatus that prints on continuous forms such as roll paper and a post-processing device that performs cutting, sorting, and other handling of the continuous forms which have been printed.

Figure 1:
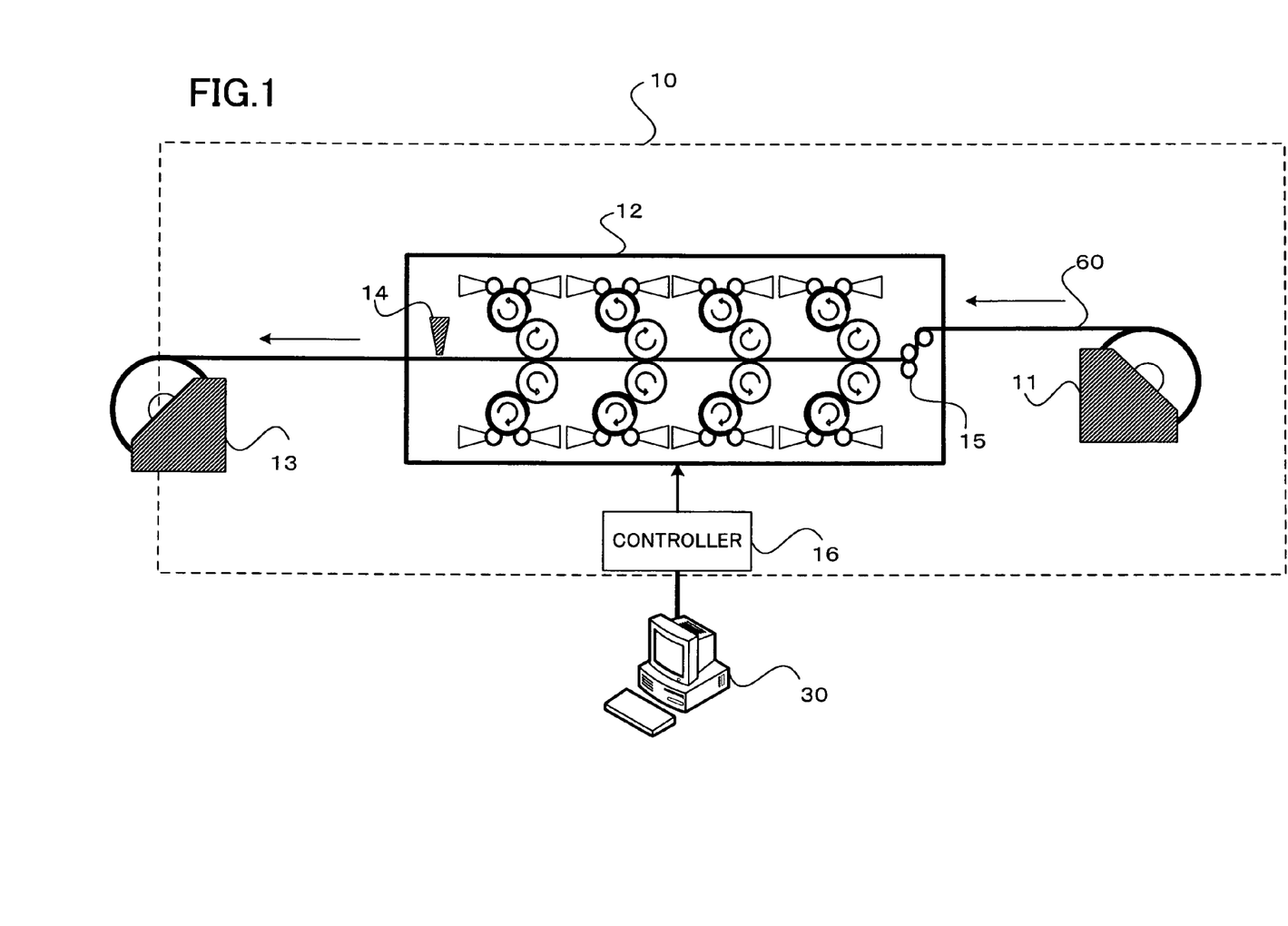
FIG. 1 is a diagram showing a configuration of an image forming apparatus 10 in a printing system according to one exemplary embodiment of the invention.

FIG. 1 is a diagram showing a configuration of the image forming apparatus 10 in the printing system according to one exemplary embodiment of the invention.

As shown in FIG. 1, the image forming apparatus 10 in the present exemplary embodiment includes a paper feeder 11, a printing unit 12, a stacker 13, and a controller 16.

The paper feeder 11 feeds roll paper 60 which has not been printed to the printing unit 12. The stacker 13 is a holder into which the roll paper 60 printed by the printing unit 12 is reeled in. In this way, the stacker 13 is configured to receive the roll paper 60 from the forward end of the roll paper 60, or in the forward direction of the transported paper.

The controller 16 controls the printing operation of the printing unit 12 according to instructions from a host device 30.

The printing unit 12 is a plate printing device that performs printing using printing plates prepared beforehand and prints on the roll paper 60 fed from the paper feeder 11 under the control of the controller 16. This printing unit 12 is provided with drive rollers 15 and a mark printing component 14. The drive rollers 15 transport the roll paper 60 at a speed specified by the controller 16.

The mark printing component 14, immediately after printing of information across plural pages on the roll paper 60, prints information relevant to print results of the plural pages on the roll paper 60 following the pages on which the information has been printed. This print result information will be explained in greater detail later.

Figure 2:
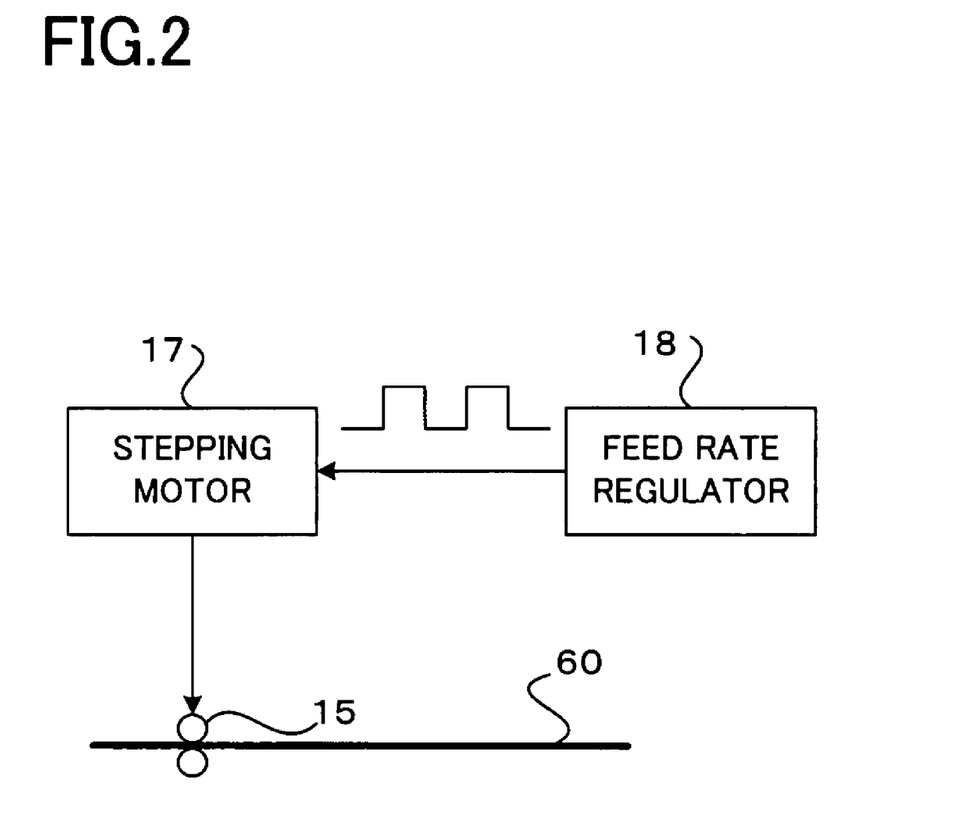
FIG. 2 is a diagram showing an arrangement for driving of drive rollers 15.

FIG. 2 shows an arrangement for driving of the drive rollers 15. Inside the printing unit 12, a stepping motor 17 and a feed rate regulator 18 are provided, as shown in FIG. 2. The stepping motor 17 drives the drive rollers 15 in proportion to the number of control pulses input to it. The feed rate regulator 18 regulates the feed rate of the roll paper 60 which is transported by the feed rollers 15 by regulating the number of control pulses which are supplied to the stepping motor 17.

Figure 3:
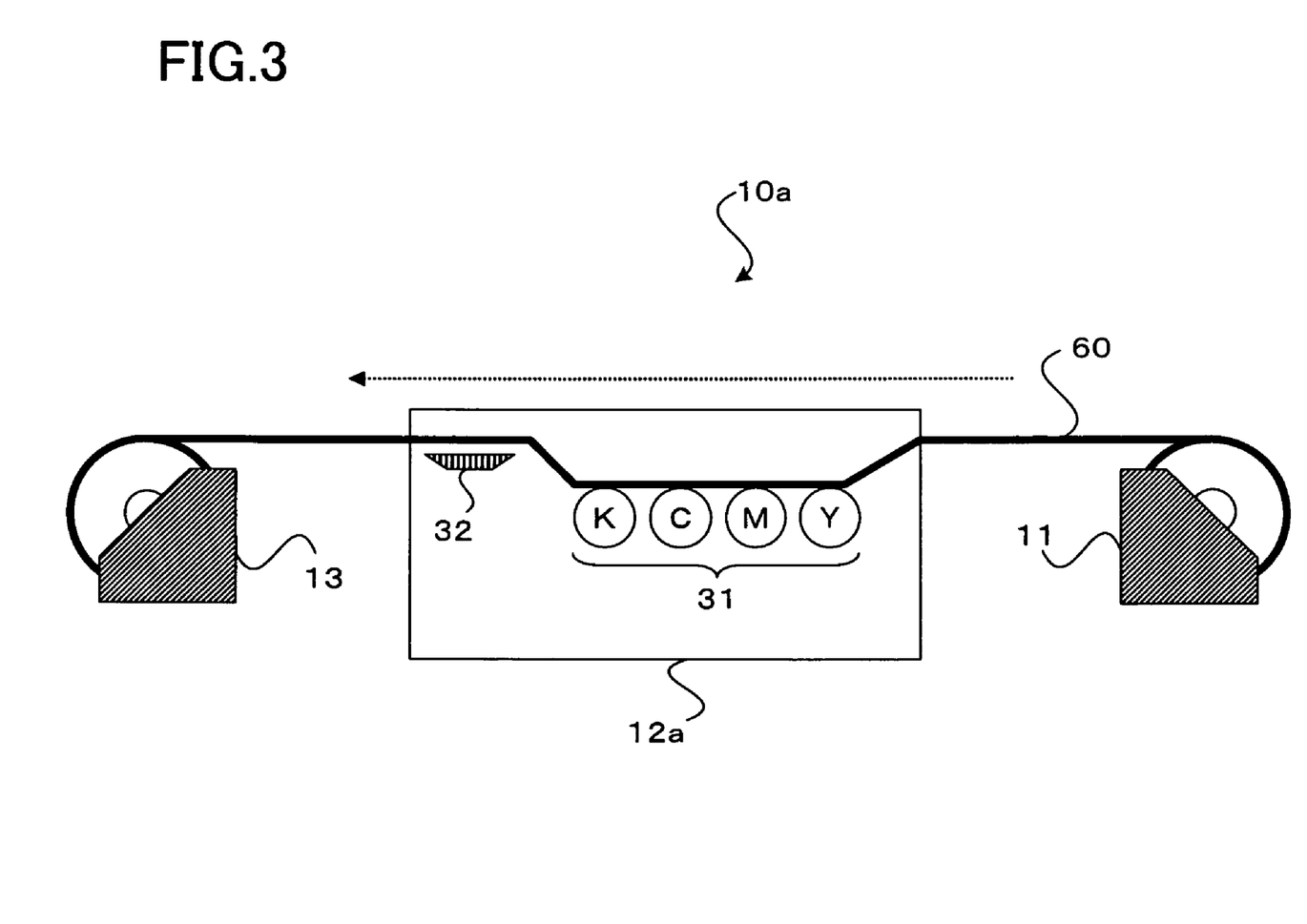
FIG. 3 is a diagram showing an image forming apparatus 10a constructed with a printing unit 12a that performs electrophotographic printing operation.

While an example of the image forming apparatus 10 utilizing the plate printing device is shown in FIG. 1, an image forming apparatus 10a utilizing an electrophotographic printing device capable of printing variable information, which is as shown in FIG. 3, may be used.

The image forming apparatus 10a shown in FIG. 3 is composed of a printing unit 12a that performs electrophotographic printing operation, a paper feeder 11, and a stacker 13. The printing unit 12a is provided with photoreceptor drums 31 employed independently for each color and a fixing device 32.

In such printing unit 12a, by irradiating these photoreceptor drums 31 with a laser beam, respective electrostatic latent images are formed on the photoreceptor drums 31. The electrostatic latent images formed on the photoreceptor drums 31 are developed with toners of each color by development devices (not shown) and transferred onto the roll paper 60. The toner images transferred to the roll paper 60 are fixed onto the roll paper 60 by the fixing device 32.

In the case where the image forming apparatus employing the image forming apparatus 10a as shown in FIG. 3 is used, a paper feeder 21 for a post-processing device 20 can be configured to transport the roll paper 60 at a higher speed than the speed of the roll paper reeled by the stacker 13 of the image forming apparatus 10a.

Instead of the image forming apparatus 10a employing the electrophotographic printing device, an ink jet type printing device may also be utilized.

Figure 4:
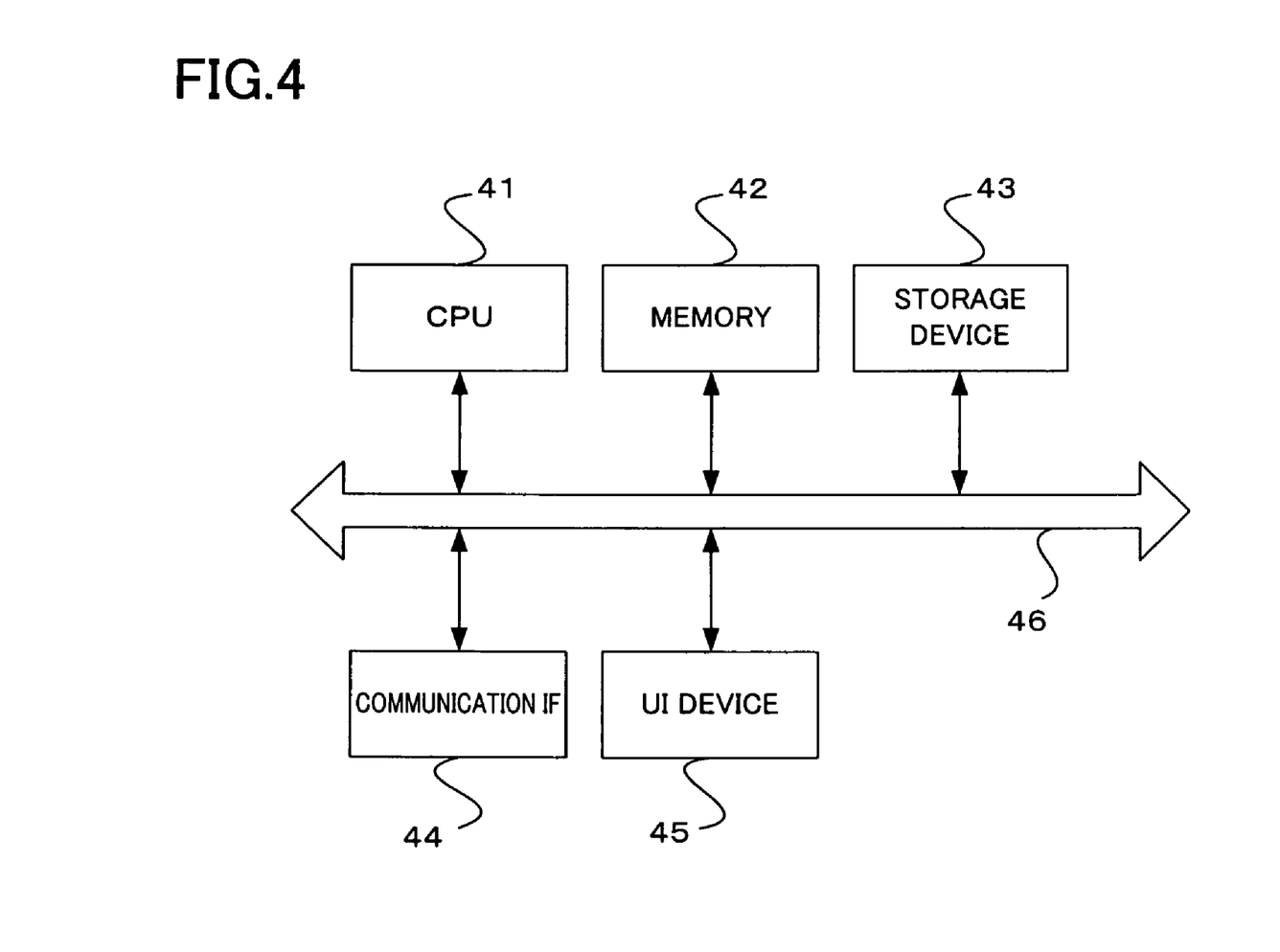
FIG. 4 is a diagram showing an example of a hardware structure of a controller 16 mentioned in FIG. 1.

Then, a hardware structure of the controller 16 shown in FIG. 1 is shown in FIG. 4. As shown in FIG. 4, the controller 16 includes a CPU 41, a memory 42, a storage device 43 such as a hard disk drive (HDD), a communication interface (IF) 44 for transmitting/receiving data to/from the host device 30 and the printing unit 12, and a user interface (UI) device 45 including a touch panel or a liquid crystal display and a keyboard. These components are interconnected via a control bus 46.

The CPU 41 executes predetermined processes in accordance with a control processing program stored in the memory 42 or the storage device 43 and controls the operation of the controller 16. The control processing program may be provided in such a manner in which it is stored in a storage medium such as CD-ROM, instead of being provided from the memory 42 or the storage device 43. This storage medium may be a magnetic disk, a semiconductor memory, or any other storage medium. The control processing program is read from such storage medium into the controller 16 to control the operation of the controller 16.

Figure 5:
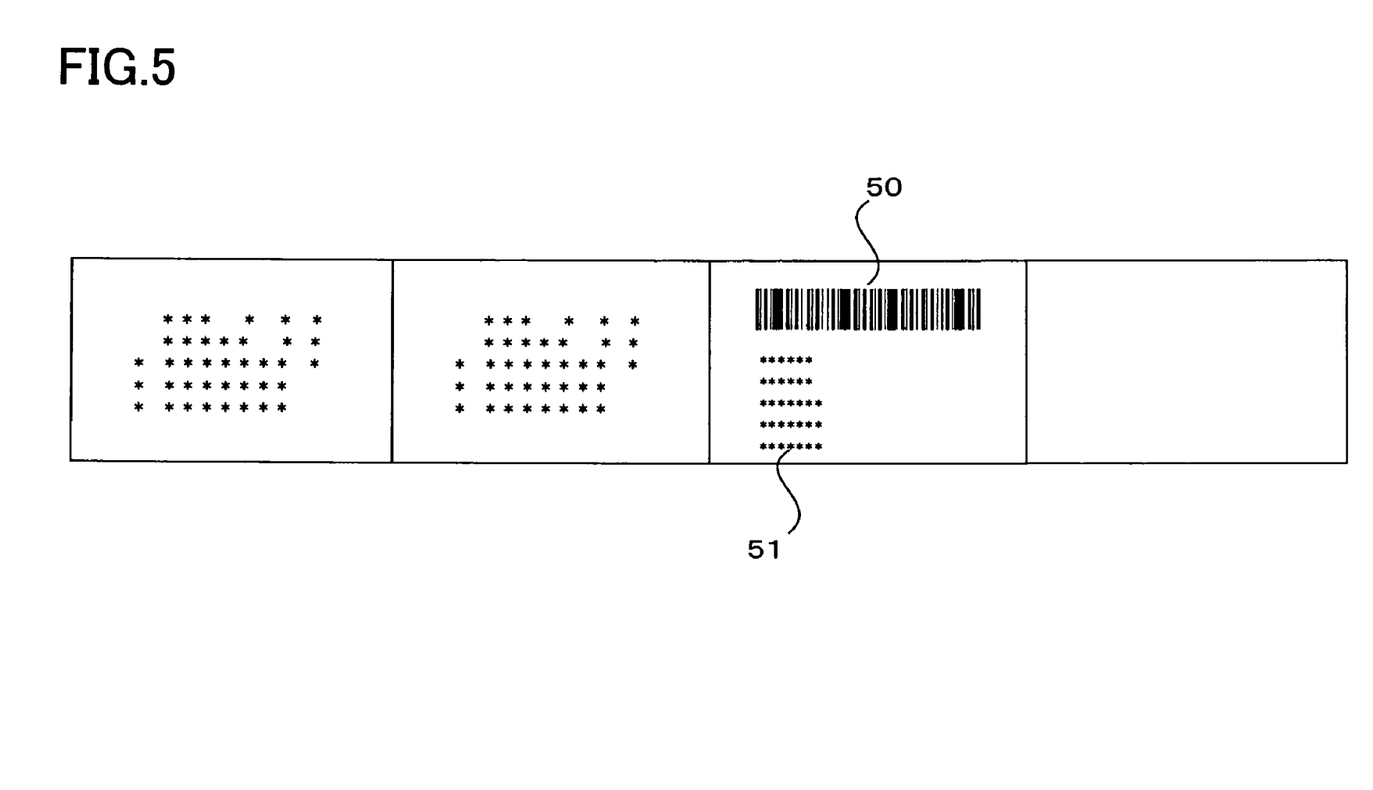
FIG. 5 illustrates a concrete example of print result information printed on roll paper 60 by a mark printing component 14.

Next, a concrete print example of print result information printed on the roll paper 60 by the mark printing component 14 is shown in FIG. 5.

In the example shown in FIG. 5, print result information 50 provided in a mark such as one-dimensional bar code and print result information 51 provided in characters are printed. Although the one-dimensional bar code which is exemplary of the printed mark for the print result information 50 is depicted in FIG. 5, other marks such as a Quick Response (QR) code which is two-dimensional code may be utilized.

Figure 6:
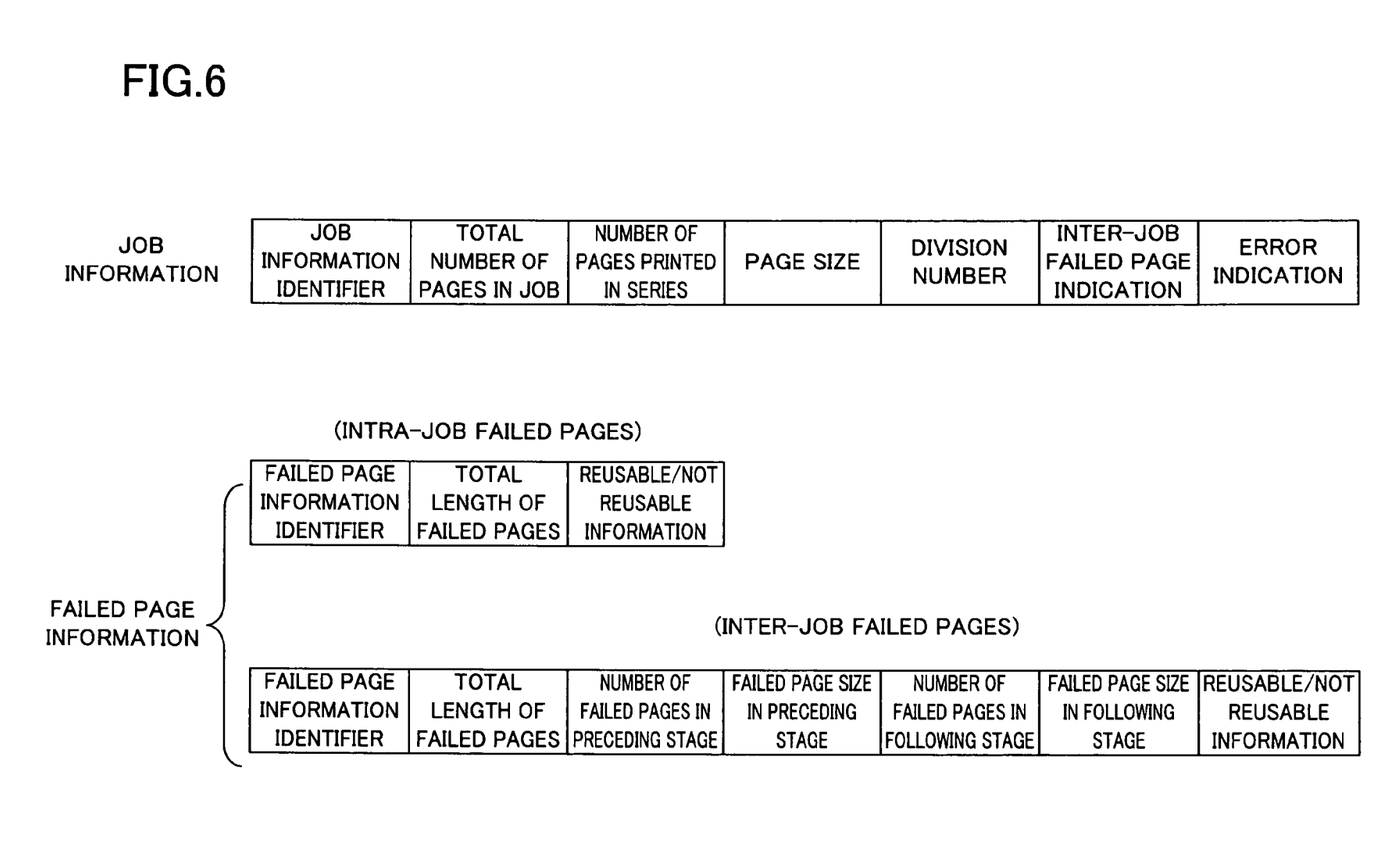
FIG. 6 illustrates a particular example of data structure of the print result information.

Then, a particular example of data structure of the print result information printed in this way is shown in FIG. 6.

In the present exemplary embodiment and in the following description, it is assumed that there are two types of print result information: job information (normal page information) specific to normal pages which have been printed normally; and failed page information specific to a failed page(s) occurred during the printing. The failed page information is further classified into two types: intra-job failed page information which refers to information regarding a failed page(s) occurred during a print job being executed; and inter-job failed page information which refers to information regarding a failed page(s) occurring between one print job and the next print job.

Failed pages involve all pages that have not been printed normally. In particular, these pages involve faulty pages which have been printed, but abnormally, and blank pages on which nothing has been printed.

Job information is made up of a job information identifier, the total number of pages in the job, the number of pages printed in series, page size, division number, inter-job failed page indication, and error indication. From these details of information, normal pages which have been printed normally are recognized.

The total number of pages in the job indicates the total number of pages in the print job. The number of pages printed in series indicates the number of successively printed pages among the pages printed by the print job. If all pages of the job have been printed successfully without an interruption due to a failure causing stop of printing during the print job, the tonal number of pages in the job is equal to the number of successively printed pages. Page size indicates the size of each of the pages of the print job. Division number indicates the number of parts into which the print job has been divided due to stop of printing, a paper jam, etc. If all pages of the job have been printed in series successfully, the division number is 0. After each stop of printing during the job, the division number is incremented by one.

Inter-job failed page indication indicates whether there is a failed page(s) between one print job and the next print job. Error indication indicates whether any error has occurred during the print job.

Upon the completion of printing of print data, job information is printed on a page that follows the last page of the print data.

Failed page information relevant to intra-job failed pages is made up of a failed page information identifier, the total length of failed pages, and reusable/not reusable information. Failed page information relevant to inter-job failed pages is made up of a failed page information identifier, the total length of failed pages, the number of failed pages in the preceding stage, failed page size in the preceding stage, the number of failed pages in the following stage, failed page size in the following stage, and reusable/not reusable information.

The total length of failed pages indicates the length of all failed pages. Reusable/not reusable information indicates whether the paper of the failed pages is reusable or not reusable. In the case of inter-job failed page information, further, the number and the page size of failed pages occurred after the end of the preceding print job until the stop of printing are printed as the number of failed pages in the preceding stage and failed page size in the preceding stage. The number and the page size of failed pages occurred after the roll paper 60 begins to be transported until the start of the next print job are printed as the number of failed pages in the following stage and failed page size in the following stage.

In other words, in the inter-job failed page information, the total length of failed page is calculated by the following equation.

Total length of failed pages=the number of failed pages in the preceding stage×failed page size in the preceding stage+ the number of failed pages in the following stage×failed page size in the following stage.

If failed pages occur, failed page information is printed on a page just before normal print data begins to be printed upon the end of failed pages being transported, that is, on the last one of the failed pages. Reusable/not reusable information within the failed page information indicates whether the paper of the failed pages is reusable or not reusable in another printing device or the like. Therefore, if the failed pages are blank, reusable/not reusable information is printed as reusable. If any data is printed on the failed pages, reusable/not reusable information is printed as not reusable. For example, when the print job being printed is canceled, the whole print job is treated as failed pages that are not reusable.

Figure 7:
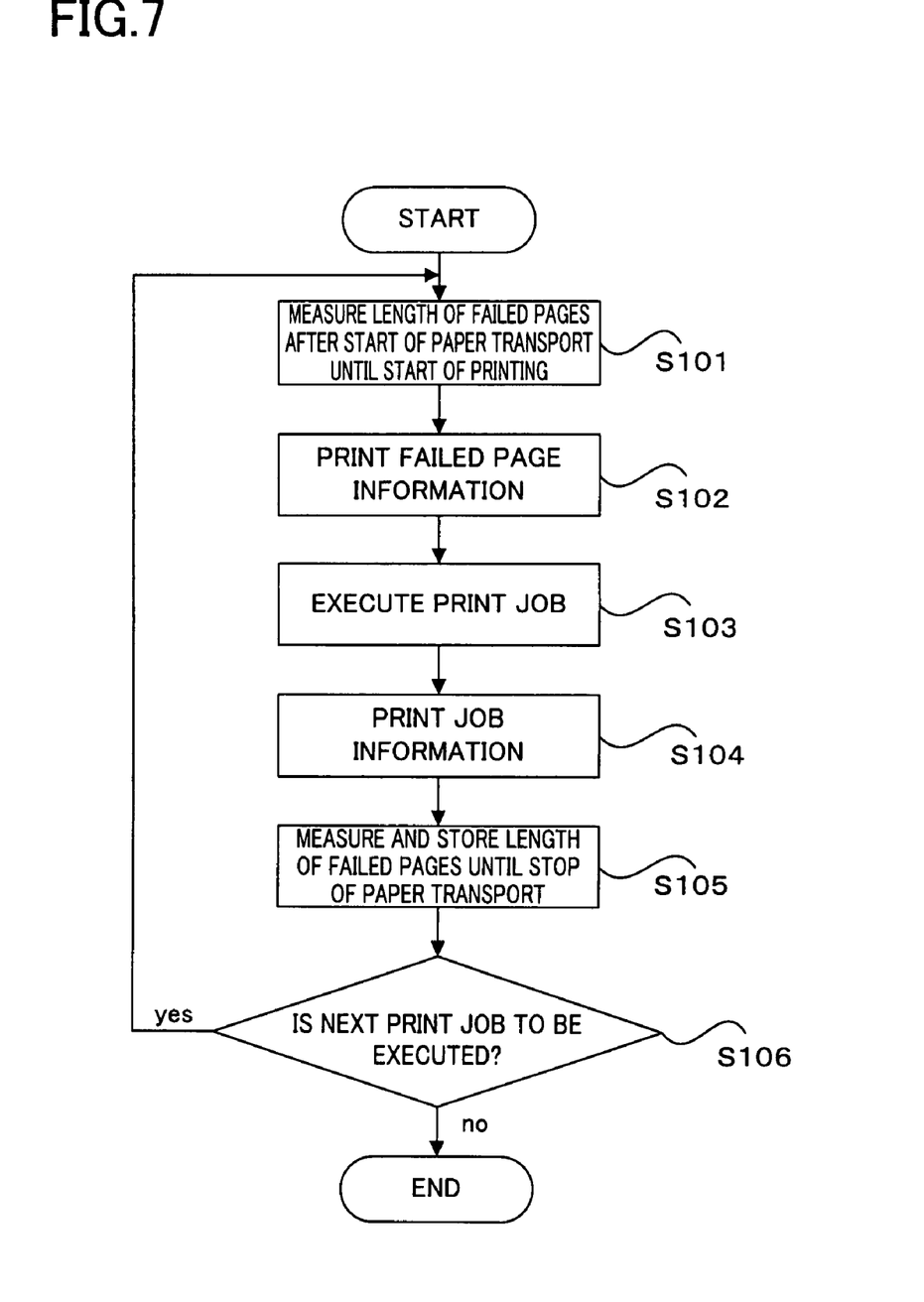
FIG. 7 is a flowchart illustrating the operation of the image forming apparatus 10 in the printing system according to one exemplary embodiment of the invention.

Then, the operation of the image forming apparatus 10 in the printing system of the present exemplary embodiment is explained in detail with reference to a flowchart of FIG. 7.

First, roll paper 60 is set in the paper feeder 11 of the image forming apparatus 10 and, when a print instruction is received from the host device 30, the printing unit 12 starts printing. Here, the following description assumes that paper size per page is 11 in. (inches) and a print job having a total number of 1000 P (pages) is executed.

Then, the length of failed pages after the roll paper 60 begins to be transported until the start of the printing is measured (step S101). Because the print job is not yet executed now, failed page information (for example, total length of failed pages=110 inches, reusable/not reusable information=reusable) is printed on a page just before the start of printing of print data (step S102).

After that, the print job is executed and print data is printed on the roll paper 60 (step S103). Here, it is assumed that all 1000 pages are printed in series without occurrence of a failed page during the execution of the print job.

After the printing, job information is printed on the 1001st page by the mark printing component 14 (step S104). Here, the details of the job information printed are as follows: the total number of pages in the job=1000 pages, the number of pages printed in series=1000 pages, page size=11 inches, division number=0, inter-job failed page indication=none, and error indication=none.

Then, the length of failed pages after the end of the print job until the stop of roll paper transport is measured and stored (step S105). Here, it is assumed that the failed pages length information is stored into a nonvolatile storage medium so that the information is not lost even when the power supply is turned off.

Subsequently, when an instruction for the next print job is issued by the host device 30, the process returns to step S101 and repeats the same steps (step S106). After one print job is executed, when another print job is executed, the sum of the failed pages length measured in steps 101 and the failed pages length measured beforehand in step S105 is printed on the roll paper as inter-job failed page information at step S102.

If abnormal printing occurs during the execution of the print job in step S103, information regarding the abnormally printed pages is printed on the last one of the failed pages as intra-job failed page information.

Figure 8:
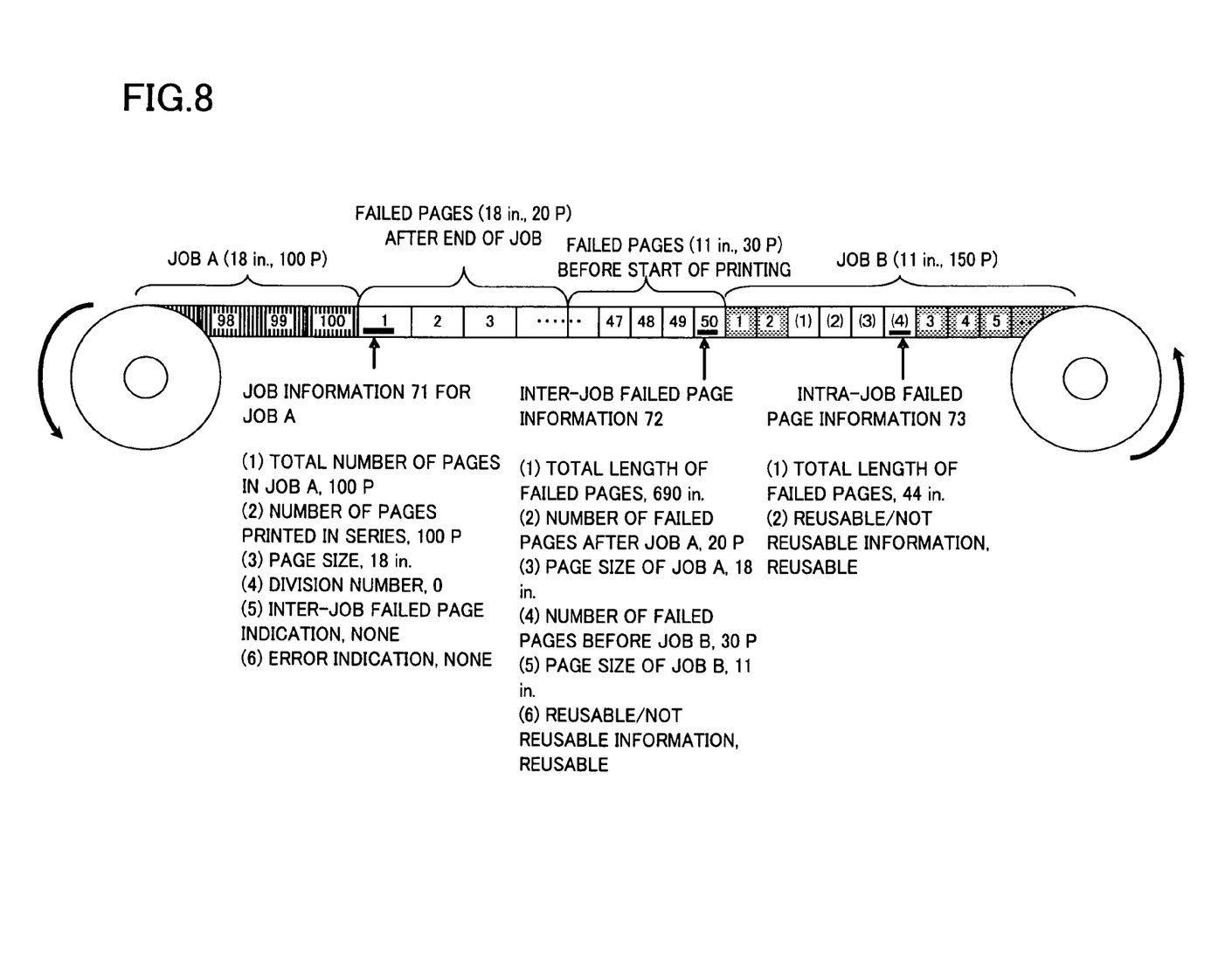
FIG. 8 illustrates a concrete example of print result information printed on the roll paper 60.

A concrete example of print result information that is printed on the roll paper 60 by the above process is shown in FIG. 8.

In FIG. 8, print result information is explained for an instance where two print jobs are executed. It is assumed that job A has a total number of 100 pages, wherein page size is 18 inches, and job B has a total number of 150 pages, wherein page size is 11 inches.

First, job A is executed and all 100 pages are printed in series. Then, job information 71 for the job A is printed on a page following the last page (the 100th page) of the job A.

Here, the job information 71 for the job A involves the following details: (1) 100 P (pages) as the total number of pages in the job A; (2) 100 P (pages) as the number of pages printed in series; (3) 18 in. (inches) as page size; (4) 0 as division number; (5) "none" as inter-job failed page indication; and (6) "none" as error indication.

After the end of printing of the job A, the transport of the roll paper 60 stops. When job B starts, the roll paper 60 begins to be transported. When printing of the job B is executed, inter-job failed page information 72 is printed on the last failed page that precedes the first page of the job B.

This inter-job failed page information 72 involves the following details: (1) 690 in. as the total length of failed pages; (2) 20 P as the number of failed pages after the job A (the number of failed pages in the preceding stage); (3) 18 in. as page size of the job A (page size in the preceding stage); (4) 30 P as the number of failed pages before the job B (the number of failed pages in the following stage); (5) 11 in. as page size of the job B (page size in the following stage); and (6) "reusable" as reusable/not reusable information.

After the start of printing of the job B, if failed pages have occurred before the end of the job B printing, intra-job failed page information 73 is printed on the last one of the failed pages occurred. Here, four blank pages (4×11 inches) are assumed to occur as failed pages.

This intra-job failed page information 73 involves the following details: (1) 44 in. as the total length of failed pages; and (2) "reusable" as reusable/not reusable information.

Figure 9:
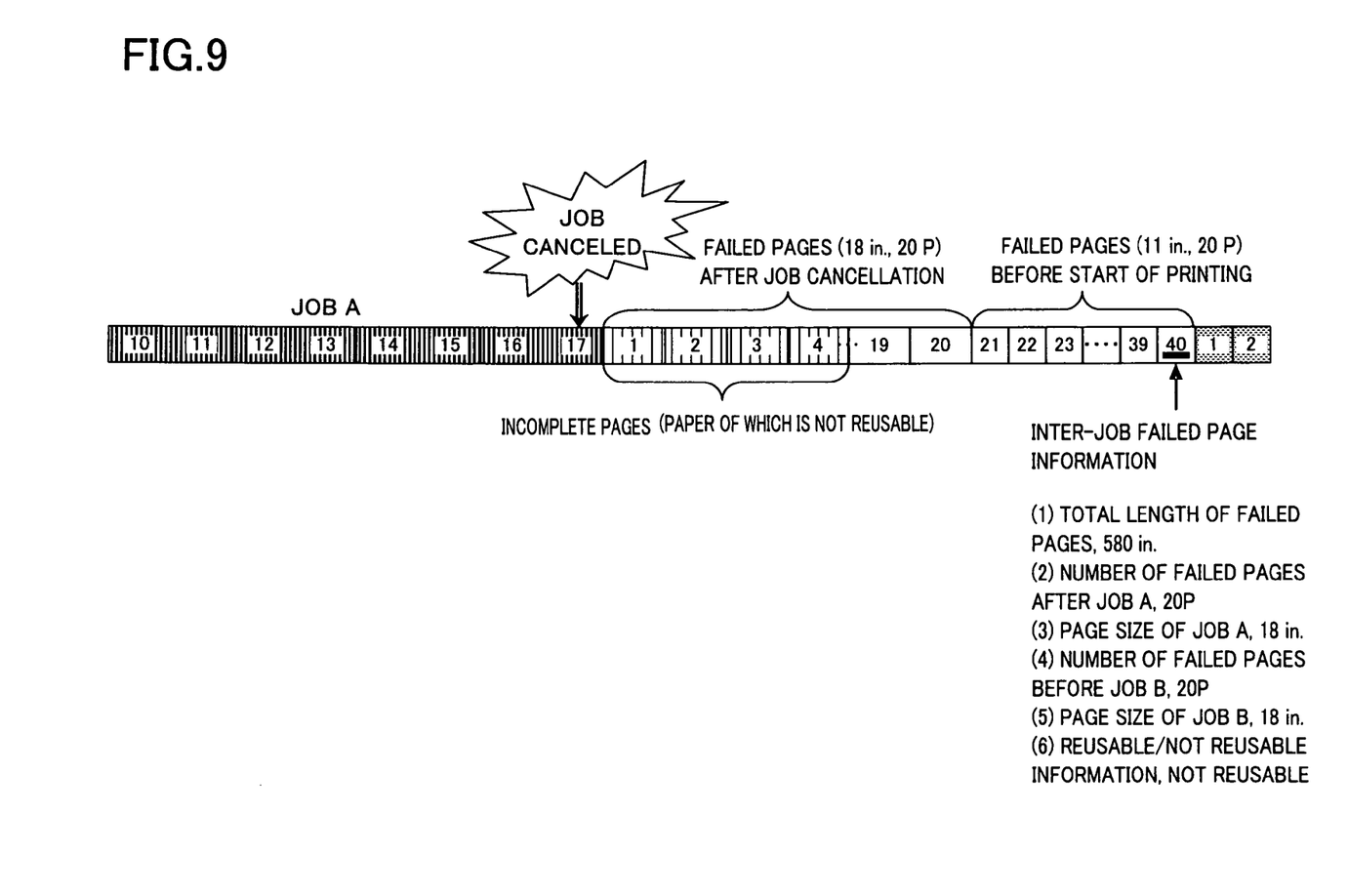
FIG. 9 illustrates another concrete example of print result information printed on the roll paper 60.

Another concrete example of print result information that is printed on the roll paper 60 is shown in FIG. 9.

In FIG. 9, an instance where failed pages have occurred because of job cancellation during the execution of job A is illustrated. In this case of FIG. 9, it is assumed that 20 failed pages which are 18 in. long each have been occurred after job cancellation because the job A is cancelled during its execution and 20 failed pages which are 11 in. long each have been occurred before the start of printing for the start of the next print job.

In this case, inter-job failed page information is printed on the last one of failed pages. However, these failed pages include four incomplete pages because of job cancellation. Consequently, "not reusable" is set for the reusable/not reusable information in the printed failed page information.

However, it is possible to indicate whether the paper is reusable or not reusable for each page by use of reusability information specified per page of failed pages instead of reusability information regarding the aggregate of failed pages within the failed page information.

Figure 10:
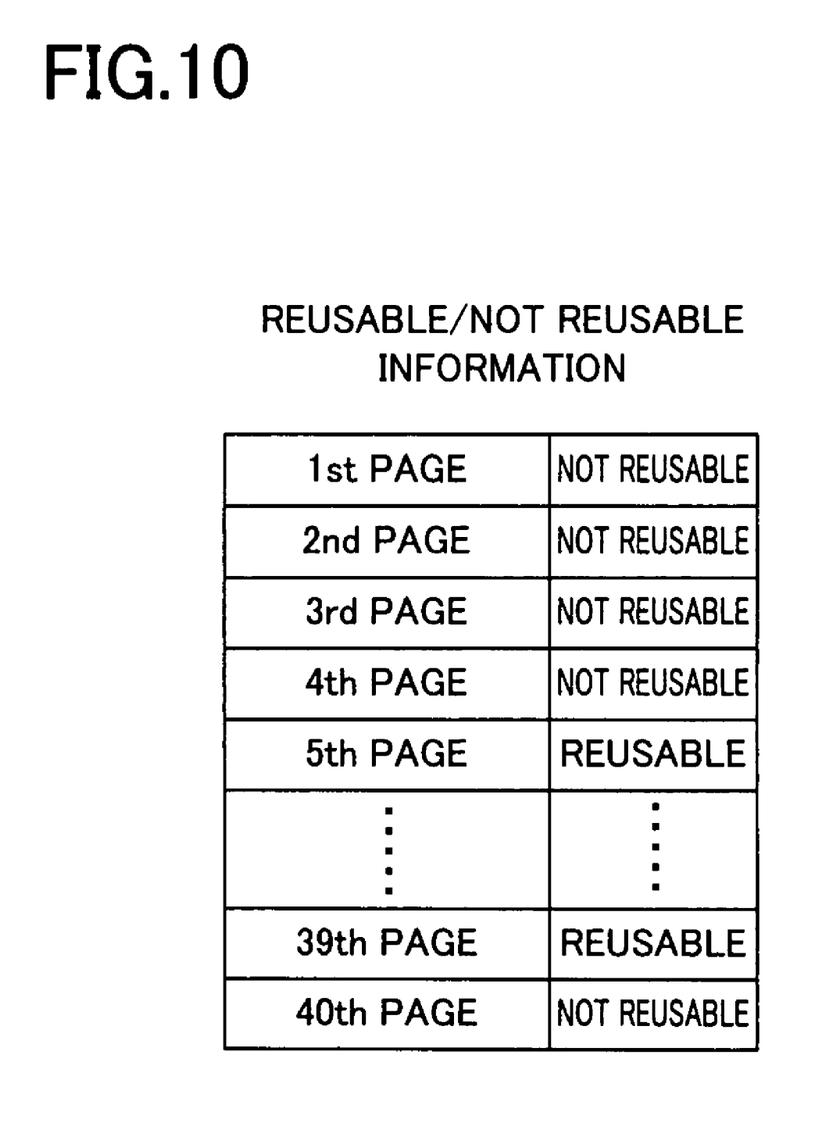
FIG. 10 illustrates an example where reusability, i.e., whether the sheet is "reusable" or "not reusable", is indicated for each of failed pages.

If it can be indicated whether the paper is "not reusable" or "reusable" for each of failed pages occurred, for example, as illustrated in FIG. 10, it is possible to assign reusable tags to only reusable pages among failed pages even if the aggregate of the failed pages is not reusable. In the example shown in FIG. 10, "not reusable" is set for the four incomplete pages occurred after the cancellation of the job A in the example shown in FIG. 9 and "reusable" is set for the remaining pages. However, "not reusable" is set for the 40th page which is the last one of failed pages, as failed page information is printed on this page.

Figure 11:
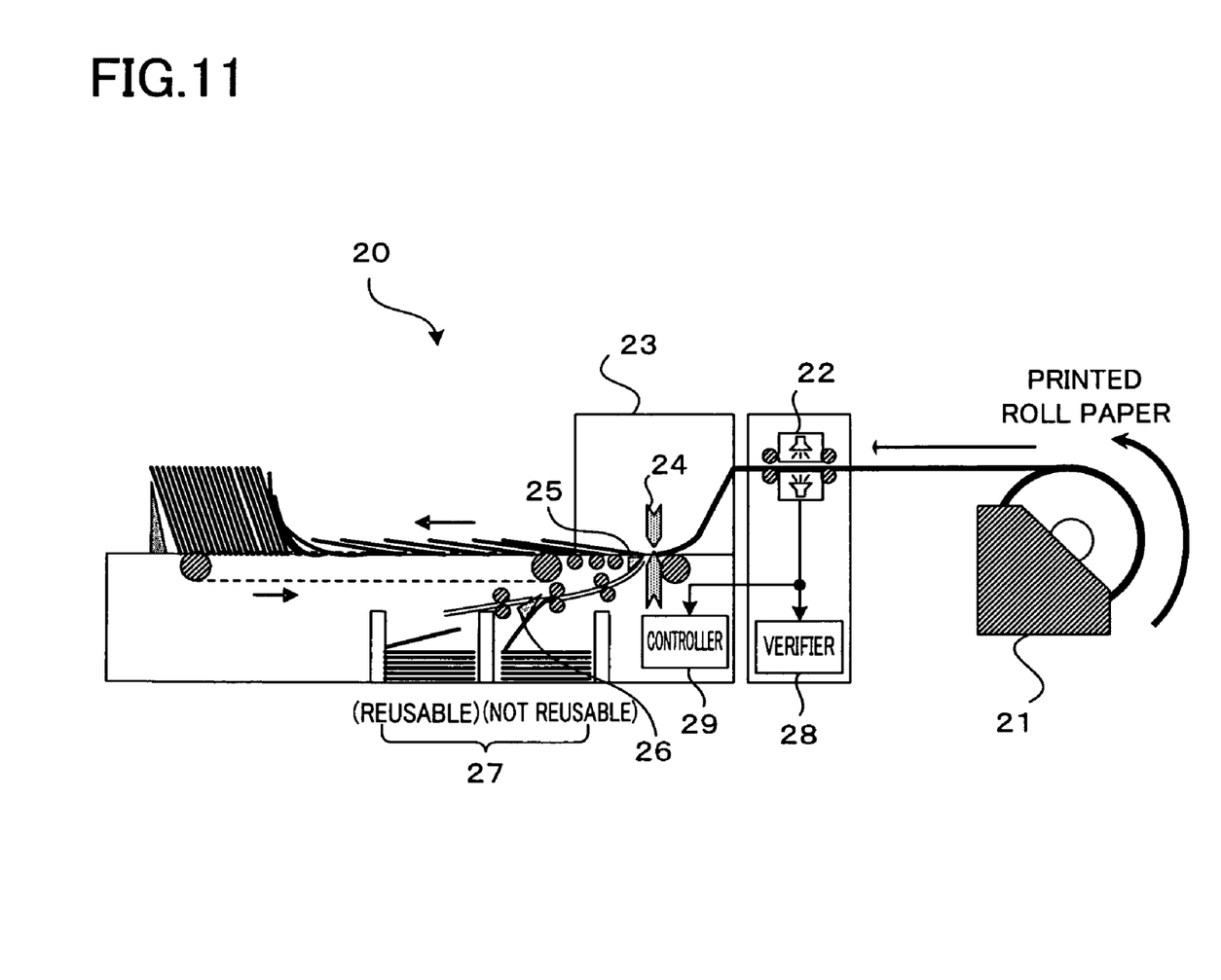
FIG. 11 is a diagram showing a configuration of a post-processing device 20 in the printing system according to one exemplary embodiment of the invention.

Next, a configuration of the post-processing device 20 in the printing system of the present exemplary embodiment is shown in FIG. 11.

As shown in FIG. 11, the post-processing device 20 in the printing system of the present exemplary embodiment is composed of a paper feeder 21, a mark reader 22, a processing unit 23, and a verifier 28. The processing unit 23 includes a cutter 24, a sorter 25, a separator 26, a failed page eject section 27, and a controller 29.

The paper feeder 21 feeds roll paper printed by the image forming apparatus 10 to the processing unit 23. If the image forming apparatus 10 and the paper feeder 21 are located at a distance apart from each other, the roll paper 60 received in the stacker 13 of the image forming apparatus 10 is transported in some way to the post-processing device 20.

The mark reader 22 reads print result information printed on the roll paper fed by the paper feeder 21. The controller 29 controls the operation of the processing unit 23 according to the print result information read by the mark reader 22. The processing unit 23 processes the roll paper fed by the paper feeder 21 under the control of the controller 20.

The controller 29 can be implemented in the same structure as the hardware structure of the controller 16 shown in FIG. 4. In the controller 29 as well, the CPU is responsible for control of the operation of the controller 29 by executing predetermined processes in accordance with a control processing program which has been set up in advance. This control processing program may be provided in such a way in which it is stored in a storage medium such as CD-ROM. This storage medium may be a magnetic disk, a semiconductor memory, or any other storage medium. The control processing program is read from such storage medium into the controller 29 to control the operation of the controller 29.

The verifier 28 verifies whether specified print jobs have been performed normally, based on the print result information read by the mark reader 22. The cutter 24 cuts the roll paper fed by the paper feeder 21 page by page based on the page size information included in the job information.

The sorter 25 sorts the cut pages into pages which have been printed normally and pages which have not been printed normally (failed pages), based on the print result information read by the mark reader 22. Here, the pages which have not been printed normally include blank pages on which nothing has been printed.

The separator 26 separates the pages sorted by the sorter 25 as those which have not been printed normally into reusable pages and non-reusable pages, based on the reusable/not reusable information within the print result information read by the mark reader 22.

Figure 12:
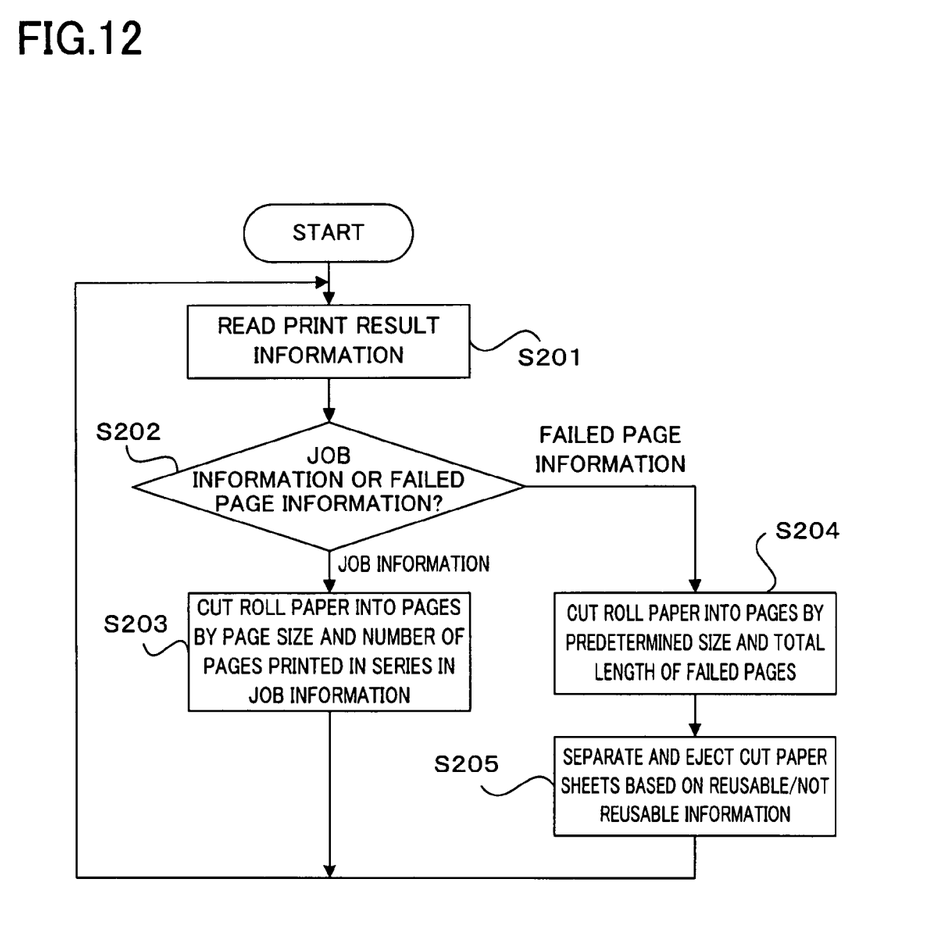
FIG. 12 is a flowchart illustrating the operation of the post-processing device 20 in the printing system according to one exemplary embodiment of the invention.

Then, the operation of the post-processing device 20 in the printing system of the present exemplary embodiment is explained in detail with reference to a flowchart of FIG. 12.

Printed roll paper is set in the paper feeder 21 and the roll paper is fed from the paper feeder 21 to the mark reader 22 and the processing unit 23. Then, the mark reader 22 finds and reads first print result information printed on the roll paper (step S201). Here, job information is assumed to have been read and, for example, it has the following details: the total number of pages in the job=1000 P, the number of pages printed in series=1000 P, page size=11 in. (inches), division number=0, inter-job failed page indication=none, and error indication=none. The controller 29 determines whether the print result information which has been read is job information or failed page information (step S202) from the identifier of the read print result information. Upon determining that it is job information, the roll paper is cut by the cutter 24 into pages by page size and the number of pages printed in series in the job information (step S203).

During the execution of this step S203, the controller 29 continues to monitor whether other print result information is found. If another print result information is found before the completion of cutting the paper into 1000 pages, the controller notifies the operator or the like of an abnormal event, as the read print result information conflicts with the actual number of printed pages.

After the completion of cutting the paper into 1000 pages, when other print result information is read again by the mark reader 22 (step S201), it is determined whether the read print result information is job information or failed page information (step S202). Here, the read print result information is assumed to be failed page information having the following details: the total length of failed pages is 550 inches and reusable/not reusable information=reusable.

Then, the controller 29 controls the cutter 24 to cut the roll paper by predetermined size (for example, A4 size) and controls the sorter 25 to direct the cut paper sheets to the failed page eject section 27 (step S204). Because of reusable/not reusable information=reusable, the controller 29 also controls the separator 26 to eject the paper sheets to a reusable paper stacker in the failed page eject section 27 (step S205). However, the controller 29 controls the separator 26 to eject the first failed page on which failed page information is printed and a page fraction less than A4 size resulting from the cutting into A4 size sheets to a non-reusable paper stacker.

The verifier 28 measures the distance over which the roll paper has been transported. If other print result information is detected before the completion of processing for the total length of failed pages in the failed page information, the verifier notifies the operator that an abnormal event has occurred.

If failed pages occur during a print job, sorting into normally printed pages and failed pages is executed by such a way of processing as described below.

For example, it is assumed that job information has now been read by the mark reader 22 and its details are as follows: the total number of pages in the job=1000 P, the number of pages printed in series=800 P, page size=11 in. (inches), division number=1, inter-job failed page indication=none, and error indication=none.

In this case, the controller 29 controls the cutter 24 to cut the roll paper into 800 pages which are 11 inches long each in the same way as in the above-described step S203.

Intra-job failed pages are processed in the same way as in the above-described steps S204 and S205, based on failed page information which has then been read.

For the remaining print job after the failed pages, the cutting is performed in the same way as in the step S203, based on the job information.

Figure 13:
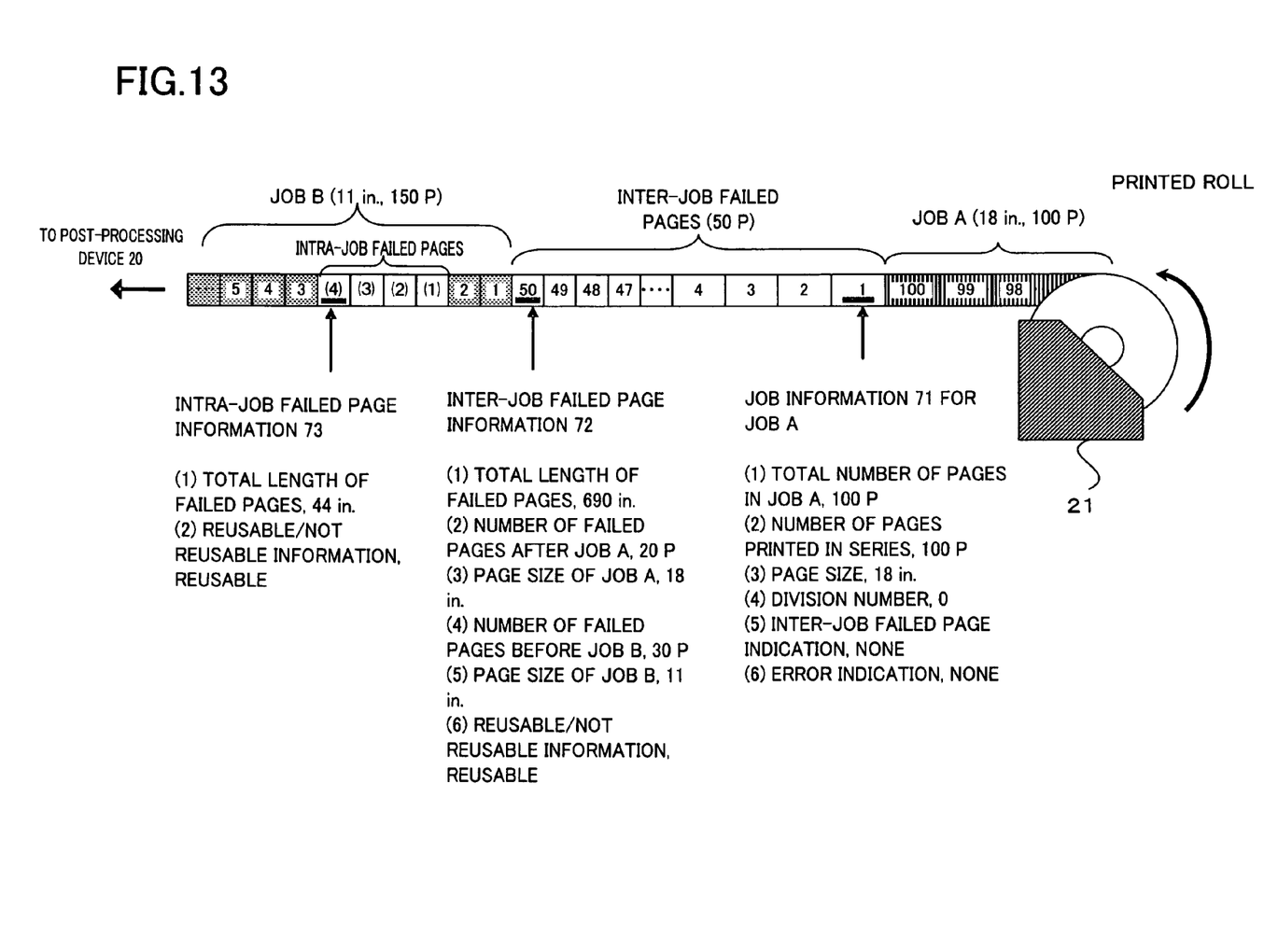
FIG. 13 illustrates details on feeding of printed roll paper from a paper feeder 21 to the post-processing device 20.

In the printing system of the present exemplary embodiment, the above-described processing is enabled by setting and feeding the printed roll paper on which print data and print result information have been printed by the image forming apparatus 10 in the post-processing device for processing the roll paper. Specifically, the image forming apparatus 10 is adapted such that, after printing a specified print job and after the occurrence of any event such as failed pages, print result information representing the details of the event is printed just after the occurred event. Consequently, by unrolling the printed roll paper, the paper is fed to the post-processing device 20 in reverse order to the order in which the paper has been printed in the image forming apparatus 10. Thus, in the post-processing device 20, immediately after a page on which print result information has been printed is fed, the print result of the content to which the print result information refers is fed, as shown in FIG. 13.

In consequence, in the post-processing device 20, at a point of time when print result information is read, the upcoming content of the print result can be anticipated.

MODIFICATION EXAMPLES

In the foregoing exemplary embodiment, the invention has been explained with regard to the case of printing on roll paper. Not limited to such application, the invention can be applied in the same way to printing on other continuous forms paper such as fanfold paper in which continuous pages are folded in a zigzag fashion along perforations between pages. Even with such fanfold paper, by stacking once printed fanfold paper and unfolding the printed fanfold paper which has been stacked, the paper can be fed to the post-processing device in reverse order from the last printed page.

In the foregoing exemplary embodiment, an example has been described where failed pages are set apart based on failed page information specific to failed pages and information for normally printed pages and the failed pages are transported to the failed page eject section 27. However, the invention is not so limited. The invention can also be configured such that normal pages are set apart based on failed page information specific to failed pages and information for normally printed pages and the normal pages are transported to a normal page eject section.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A printing system comprising:
   a printing unit that, after printing information across a plurality of pages, prints print result relevant information about printing of the plurality of pages on continuous forms paper following the plurality of pages;
   a holder unit that receives and holds the continuous forms paper printed by the printing unit in the same order in which the paper has been printed by the printing unit;
   a paper feeding unit that feeds the printed continuous forms paper which has been held in the holder unit in reverse order to the order in which the paper has been printed by the printing unit;
   a reading unit that reads the print result relevant information printed on the continuous forms paper fed by the paper feeding unit; and
   a post-processing unit that post-processes the continuous forms paper fed by the paper feeding unit, based on the print result relevant information read by the reading unit, the post-processing unit includes:
      a cutting unit that cuts the continuous forms paper fed by the paper feeding unit into individual pages; and
      a sorting unit that sorts the individual pages into pages which have been printed normally and pages which have not been printed normally, based on the print result relevant information read by the reading unit, wherein
   the print result relevant information includes failure information, the failure information being of a type of failure of either an inter-job failure and intra-job failure, the type of failure information causing a specific operation for the post-processing unit,
   the print result relevant information also includes normal page information specific to normal pages which have been printed normally or failed page information specific to failed pages occurred during the printing,
   the failed page information includes reusable/not reusable information indicating whether the paper for the failed pages is reusable or not reusable, and
   the post-processing unit further includes a separating unit that separates the pages sorted as failed pages by the sorting unit into reusable pages and non-reusable pages, based on the print result relevant information read by the reading unit.

2. A post-processing device comprising:
   a paper feeding unit that feeds printed continuous forms paper which has been held in a holder in reverse order to the order in which the paper has been printed by a printing unit;
   a reading unit that reads print result relevant information printed on the continuous forms paper fed by the paper feeding unit; and
   a post-processing unit that post-processes the continuous forms paper fed by the paper feeding unit, based on print result relevant information read by the reading unit, the post-processing unit includes:
      a cutting unit that cuts the continuous forms paper fed by the paper feeding unit into individual pages; and
      a sorting unit that sorts the individual pages into pages which have been printed normally and pages which have not been printed normally, based on the print result relevant information read by the reading unit, wherein
   the print result relevant information includes failure information, the failure information being of a type of failure of either an inter-job failure and intra job failure, the type of failure information causing a specific operation for the post-processing unit,
   the print result relevant information also includes normal page information specific to normal pages which have been printed normally or failed page information specific to failed pages occurred during the printing,
   the failed page information includes reusable/not reusable information indicating whether the paper for the failed pages is reusable or not reusable, and
   the post-processing unit further includes a separating unit that separates the pages sorted as failed pages by the sorting unit into reusable pages and non-reusable pages, based on the print result relevant information read by the reading unit.

3. A non-transitory computer readable medium storing a program causing a computer to execute a process comprising:
   feeding printed continuous forms paper which has been held in a holder in reverse order to the order in which the paper has been printed;
   reading print result relevant information printed on the fed continuous forms paper; and
   post-processing the fed continuous forms paper, based on the read print result relevant information,
   cutting the continuous forms paper fed by a paper feeding unit into individual pages; and
   sorting the individual pages into pages which have been printed normally and pages which have not been printed normally, based on the print result relevant information read by a reading unit, wherein
   the print result relevant information includes failure information, the failure information being of a type of failure of either an inter-job failure and intra-job failure, the type of failure information causing a specific operation for a post-processing unit,
   the print result relevant information also includes normal page information specific to normal pages which have been printed normally or failed page information specific to failed pages occurred during the printing,
   wherein the failed page information includes reusable/not reusable information indicating whether the paper for the failed pages is reusable or not reusable, and
   separating the pages sorted as failed pages into reusable pages and non-reusable pages, based on the print result relevant information.

* * * * *